UNITED STATES PATENT OFFICE.

GARRET CLEMENT, OF CANANDAIGUA, NEW YORK.

IMPROVEMENT IN THE PROCESS OF LEACHING ASHES.

Specification forming part of Letters Patent No. 228, dated June 10, 1837.

*To all whom it may concern:*

Be it known that I, GARRET CLEMENT, of Canandaigua, New York, have invented a new Method of Leaching Ashes for Manufacturing Potashes and other Uses, of which the following is a specification.

Let the leach be set in the usual manner and of such size as is found convenient; but the size most approved is such as to contain ten bushels of ashes. In filling the leach spread on the bottom one bushel of slaked lime, and in the center of the leach place a small quantity—about three quarts—of unslaked lime. Then put in five bushels of ashes, and on the ashes pour fifty gallons of boiling-hot lime-water. Next, place in the center of the leach one peck of unslaked lime, heated in the arch to a red heat, and on the lime place half a bushel of ashes taken hot from the arch. Next put in five bushels of ashes, and on this pour hot lime-water until the leach begins to run, and as soon as the hot water has run down in the ashes put on cold water, as much as is necessary.

What I claim as a new invention in this specification, and for which I wish to secure Letters Patent, is—

The use of hot unslaked lime and hot ashes in the quantity directed, and in the manner of disposing of them in setting up the leach, by means of which a degree of heat is produced and continued in the leach greater than can be secured by any other known means; and in this manner a leach is run down in six hours, being a shorter time and the strength of the ashes more fully extracted than by any other known method.

GARRET CLEMENT.

Witnesses:
    WALTER HUBBELL,
    THOS. M. HOWELL.